United States Patent
Yoshihiro et al.

(10) Patent No.: US 10,696,015 B2
(45) Date of Patent: Jun. 30, 2020

(54) OPTICAL MEMBER

(71) Applicant: FUJIFILM CORPORATION, Minato-ku, Tokyo (JP)

(72) Inventors: Tatsuya Yoshihiro, Kanagawa (JP); Takeharu Tani, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 16/583,291

(22) Filed: Sep. 26, 2019

(65) Prior Publication Data
US 2020/0016863 A1    Jan. 16, 2020

Related U.S. Application Data

(63) Continuation of application No. PCT/JP2018/007237, filed on Feb. 27, 2018.

(30) Foreign Application Priority Data

Mar. 30, 2017 (JP) ................. 2017-069168

(51) Int. Cl.
*B32B 7/02* (2019.01)
*B32B 7/023* (2019.01)

(52) U.S. Cl.
CPC ................... *B32B 7/023* (2019.01)

(58) Field of Classification Search
CPC . B32B 7/023; C03C 17/3435; C03C 17/3482; B23B 2251/00; G02B 5/26; G02B 5/28
See application file for complete search history.

(56) References Cited

U.S. PATENT DOCUMENTS

| 2003/0180547 | A1 | 9/2003 | Buhay et al. |
| 2009/0237782 | A1 | 9/2009 | Takamatsu et al. |
| 2012/0105965 | A1 | 5/2012 | Koyama |
| 2015/0338175 | A1 | 11/2015 | Raman et al. |
| 2016/0109971 | A1 | 4/2016 | Harada et al. |

FOREIGN PATENT DOCUMENTS

| CN | 1635952 A | 7/2005 |
| CN | 101231350 A | 7/2008 |
| CN | 101288007 A | 10/2008 |

(Continued)

OTHER PUBLICATIONS

English language translation of the following: Office action dated Oct. 29, 2019 from the JPO in a Japanese patent application No. 2019-509023 corresponding to the instant patent application.

(Continued)

*Primary Examiner* — Wen Huang
(74) *Attorney, Agent, or Firm* — Solaris Intellectual Property Group, PLLC

(57) ABSTRACT

Provided is an optical member which includes: a substrate; and a laminated structure including two or more kinds of layers having different materials which are disposed on the substrate, in which the number of layers constituting the laminated structure is 10 or more, the maximum layer thickness of the layers constituting the laminated structure is 8 nm or less, and the minimum transmittance in a wavelength range of 400 nm to 800 nm or in a wavelength range of 6 μm to 12 μm is 10% or more.

9 Claims, 7 Drawing Sheets

(56) References Cited

FOREIGN PATENT DOCUMENTS

| | | | |
|---|---|---|---|
| CN | 104838344 | A | 8/2015 |
| JP | S60-225747 | A | 11/1985 |
| JP | H02-306202 | A | 12/1990 |
| JP | H10-182192 | A | 7/1998 |
| JP | H11-157881 | A | 6/1999 |
| JP | 2004-122764 | A | 4/2004 |
| JP | 2006-334787 | A | 12/2006 |
| JP | 2012-093568 | A | 5/2012 |
| JP | 2013-256104 | A | 12/2013 |
| WO | 2016/171620 | A1 | 10/2016 |

OTHER PUBLICATIONS

International Search Report issued in International Application No. PCT/JP2018/007237 dated May 15, 2018.
Written Opinion of the ISA issued in International Application No. PCT/JP2018/007237 dated May 15, 2018.
English language translation of the following: Office action dated Apr. 3, 2020 from the SIPO in a Chinese patent application No. 201880022730.8 corresponding to the instant patent application. This office action translation is submitted now in order to supplement the understanding of the cited references which are being disclosed in the instant Information Disclosure Statement.

OPTICAL MEMBER

CROSS-REFERENCE TO RELATED APPLICATIONS

This application is a continuation application of International Application No. PCT/JP2018/007237, filed Feb. 27, 2018, the entire disclosure of which is incorporated herein by reference. Further, this application claims priority from Japanese Patent Application No. 2017-069168, filed Mar. 30, 2017, the entire disclosure of which is incorporated herein by reference.

BACKGROUND OF THE INVENTION

1. Field of the Invention

The present disclosure relates to an optical member.

2. Description of the Related Art

At present, the heat insulating function is more required for optical members.

As a heat insulating material having a high heat insulating function, a vacuum heat insulating material (0.002 W/(m·K)), glass wool (0.03 W/(m·K)), and the like are known. However, the vacuum heat insulating material and the glass wool are both optically opaque materials, and thus can be hardly used as optical members.

Under the above background, various optical members having optical properties or heat insulation properties are researched.

For example, in JP2006-334787A, as a transparent heat insulating optical member having high visible light transmittance and high infrared light blocking properties, disclosed is a transparent heat insulating optical member obtained by laminating a plurality of metal layers that reflect heat rays and a plurality of transparent light compensation layers on a transparent substrate, so as to transmit visible light and reflect heat rays, in which the light compensation layer is a transparent conductive layer formed of conductive metal oxide, a light transmittance T (510) at a wavelength of 510 nm is 74% or more, and a ratio T (900)/T (700) of a light transmittance T (700) at a wavelength of 700 nm to a light transmittance T (900) at a wavelength of 900 nm is 0.3 or less.

In JP2013-256104A, as a heat reflecting structure having excellent heat ray reflectivity, visible light transmittance, and radio wave transmittance, disclosed is a heat reflecting structure having a substrate, and an alternating optical members which is located on a substrate, in which metal layers and dielectric layers are alternately laminated, and of which both outermost layers are dielectric layers, in which the dielectric layer includes a crystalline region and an amorphous region of metal oxide.

In JP1998-182192A (JP-H10-182192A), as a heat insulating glass having greatly improved moisture resistance, disclosed is a heat insulating glass in which at least a transparent oxide film layer, a noble metal film layer, and an Al—Zn film layer are combined and sequentially laminated on the surface of a glass substrate, and an Al—Zn film layer is present so as to protect the noble metal film layer at least with an Al—Zn film layer.

SUMMARY OF THE INVENTION

However, compared with the techniques described in JP2006-334787A, JP2013-256104A, and JP1998-182192A (JP-H10-182192A), it is required to further reduce the thermal conductivity and further improve the heat insulation function.

Accordingly, an object of the present disclosure is to provide an optical member having transparency in a wavelength range of 400 nm to 800 nm or in a wavelength range of 6 μm to 12 μm, and reduced thermal conductivity.

Means for solving the above problems include the following aspects.

<1> An optical member comprising: a substrate; and a laminated structure including two or more kinds of layers having different materials which are disposed on the substrate, in which the number of layers constituting the laminated structure is 10 or more, the maximum layer thickness of the layers constituting the laminated structure is 8 nm or less, and the minimum transmittance in a wavelength range of 400 nm to 800 nm or in a wavelength range of 6 μm to 12 μm is 10% or more.

<2> The optical member according to <1>, in which the number of layers constituting the laminated structure is 100 or more.

<3> The optical member according to <1> or <2>, in which the laminated structure includes two or more kinds of metal compounds selected from the group consisting of a metal oxide, a metal nitride, a metal oxynitride, and a metal sulfide.

<4> The optical member according to <3>, in which a metal element in the two or more kinds of metal compounds is at least one kind of element selected from the group consisting of Si, Al, Nb, Mg, Zr, Ge, and Zn.

<5> The optical member according to any one of <1> to <4>, further comprising: a light interference layer having a layer thickness greater than 8 nm.

<6> The optical member according to any one of <1> to <5>, in which the minimum transmittance in a wavelength range of 400 nm to 800 nm is 10% or more, and the maximum reflectance in a wavelength range of 400 nm to 800 nm is 10% or less.

<7> The optical member according to any one of <1> to <6>, in which the minimum transmittance in a wavelength range of 400 nm to 800 nm is 10% or more, and two or more kinds of layers having different materials include a combination of $Al_2O_3$ layers and $SiO_2$ layers.

<8> The optical member according to any one of <1> to <5>, in which the minimum transmittance in a wavelength range of 6 μm to 12 μm is 10% or more, and the maximum reflectance in a wavelength range of 6 μm to 12 μm is 40% or less.

<9> The optical member according to any one of <1> to <5> and <8>, in which the minimum transmittance in a wavelength range of 6 μm to 12 μm is 10% or more, and the two or more kinds of layers having different materials include a combination of a SiN layer and an AlN layers.

According to the present disclosure, an optical member having transparency in a wavelength range of 400 nm to 800 nm or a wavelength range of 6 μm to 12 μm and a reduced thermal conductivity is provided.

DESCRIPTION OF THE PREFERRED EMBODIMENTS

Figure 1:
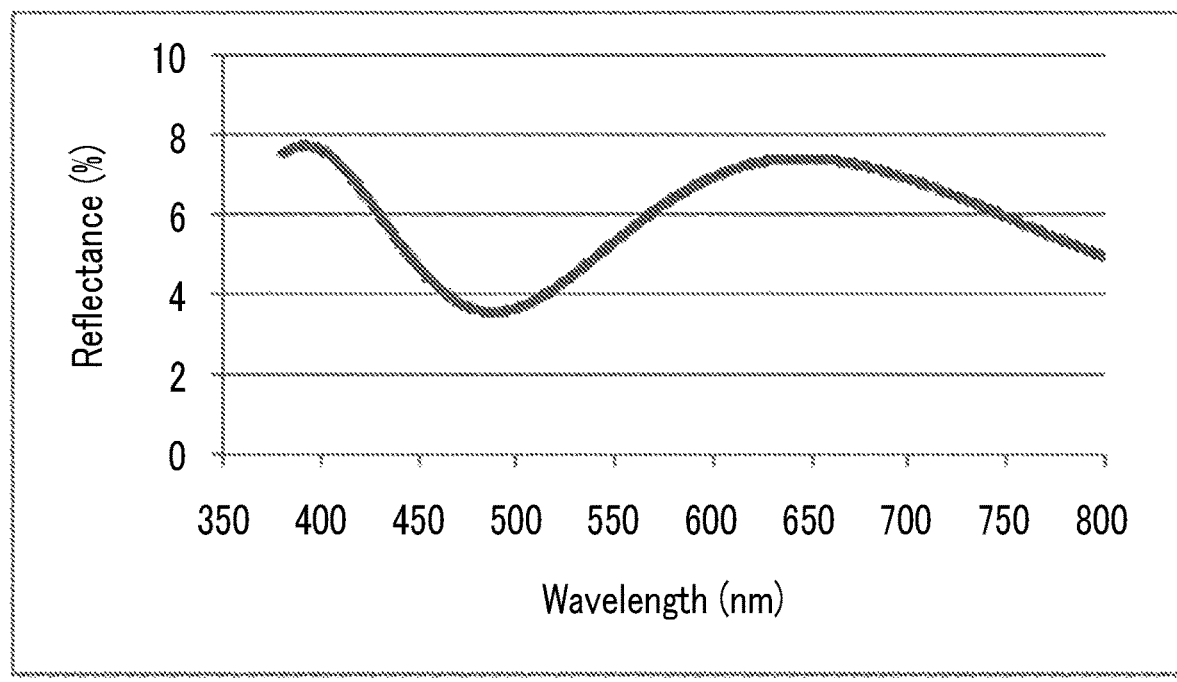
FIG. 1 is a reflection spectrum of an optical member of Example 1 in a wavelength range of 400 nm to 800 nm.

According to the present specification, the numerical range expressed by using "to" means a range including numerical values described before and after "to" as a lower limit value and an upper limit value.

The expression "metal" used in the present specification also includes semimetal (for example, Si and Ge).

The expression "light" used in the present specification refers to electromagnetic waves in general, and is not limited to visible light.

The expression "layer thickness" used in the present specification refers to the thickness of one layer.

The optical member of the present disclosure comprises a substrate, and a laminated structure that is disposed on a substrate and includes two or more kinds of layers having different materials, the number of layers constituting the laminated structure is 10 or more, the maximum layer thickness of the layers constituting the laminated structure is 8 nm or less, and the minimum transmittance in a wavelength range of 400 nm to 800 nm or in a wavelength range of 6 µm to 12 µm is 10% or more.

A form A which is one aspect of the optical member of the present disclosure is an aspect in which the minimum transmittance in a wavelength range of 400 nm to 800 nm is 10% or more.

A form B which is another aspect of the optical member of the present disclosure is an aspect in which the minimum transmittance in a wavelength range of 6 µm to 12 µm is 10% or more.

The optical member according to the form A of the present disclosure is an optical member having transparency in a wavelength range of 400 nm to 800 nm, and a reduced thermal conductivity.

The optical member according to the form B of the present disclosure is an optical member having a transparency in a wavelength range of 6 µm to 12 µm and a reduced thermal conductivity.

The main reasons of the effect are presumed as follows, but the optical member of the present disclosure is not limited by the following reasons.

Any one of optical members of the aspects A and B also comprises a laminated structure including two or more kinds of different materials, and the number of layers constituting the laminated structure is 10 or more.

An interface thermal resistance is present on the interface between two kinds of different materials.

Since, with respect to any one of optical members of the aspects A and B, the number of layers constituting the laminated structure is 10 or more, the number of interfaces having the interface thermal resistance is 9 or more, and thus it is considered that the thermal conductivity is reduced.

With respect to any one of optical members of the aspects A and B, the maximum layer thickness of the layers constituting the laminated structure is 8 nm or less.

In the present specification, the maximum layer thickness of the layers constituting the laminated structure means the maximum value in the population including the thickness of each of all the layers constituting the laminated structure.

It is considered that, with respect to any one of the aspects A and B, in a case where the laminated structure including or two or more kinds of layers having different materials satisfies both of a case where the interface reflection of phonons is generated, and a case where the layer thickness of the layers constituting the laminated structure is smaller than several tens of nm which is regarded as the mean free path of phonons, interference of phonons is generated.

According to the interference of the phonons, thermal conductivity in the laminated structure is effectively reduced.

It is considered that, in order to suppress the interference of the light (that is, visible light) in a wavelength range of 400 nm to 800 nm in the form A, it is effective that the thickness (layer thickness) of one layer is suppressed to ¹⁄₁₀₀ or less (that is, 8 nm or less) of the upper limit (800 nm) of the wavelength range.

In this regard, in the form A, as described above, since the maximum layer thickness of the layers constituting the laminated structure is 8 nm or less, the interference of light (that is, visible light) in the wavelength range of 400 nm to 800 nm is suppressed. For this reason, in the embodiment A, it is considered that the reduction in transmittance in the wavelength range of 400 nm to 800 nm is suppressed.

It is considered that, in order to suppress the interference of light (that is, infrared light) in the wavelength range of 6 µm to 12 µm in the form B, it is effective that the thickness (layer thickness) of one layer is suppressed to ¹⁄₁₀₀ or less (that is, 120 nm or less) of the upper limit (12 µm) of the wavelength range.

In this regard, in the form B, as described above, since the maximum layer thickness of the layers constituting the laminated structure is 8 nm or less, the interference of light (that is, infrared light) in the wavelength range of 6 µm to 12 µm is suppressed. For this reason, in the form B, it is considered that the reduction in transmittance in the wavelength range of 6 µm to 12 µm is suppressed.

For the above reasons, it is considered that, in the optical member of the form A, a function of having transparency in the wavelength range of 400 nm to 800 nm and a function of reducing the thermal conductivity are achieved, and in the optical member of the form B, a function of having transparency in the wavelength range of 6 µm to 12 µm and a function of reducing the thermal conductivity are achieved.

The layer thickness (8 nm or less even in the maximum layer thickness) of each layer constituting the laminated structure in the form A is significantly smaller than the wavelength of visible light (400 to 800 nm). Therefore, the visible light cannot distinguish, for example, between a first type layer (hereinafter, also referred to as an "X layer") and a second type layer (hereinafter, also referred to as a "Y layer") in the laminated structure. Therefore, in a case of being viewed with the visible light, the laminated structure is regarded as a single layer mixed material film having an average refractive index.

Similarly, the layer thickness (8 nm or less even in the maximum layer thickness) of each layer constituting the laminated structure in the embodiment B is significantly smaller than the wavelength range of 6 µm to 12 µm. For this reason, the infrared light in the above wavelength range cannot distinguish, for example, between the X layer and the Y layer in the laminated structure. Therefore, in a case of being viewed from the infrared light, the laminated structure is regarded as a single layer mixed material film having an average refractive index.

For these reasons, in the optical members of the aspects A and B, unintended light interference is suppressed.

Therefore, the optical members of the aspects A and B also have an advantage of easy optical design.

Hereinafter, the aspects A and B are described more specifically.

[Form A]

The optical member according to the form A comprises a substrate, and a laminated structure including two or more kinds of layers that are disposed on the substrate and have different materials, the number of layers constituting the laminated structure is 10 or more, the maximum layer thickness of the layers constituting the laminated structure is 8 nm or less, and the minimum transmittance in a wavelength range of 400 nm to 800 nm is 10% or more.

<Substrate>

Examples of the material of the substrate in the form A include glass, plastic, and ceramic.

Examples of the glass include natural quartz glass, synthetic quartz glass, soda glass, and lanthanum glass.

As a material of the substrate in the form A, glass is preferable. Therefore, it is easier to achieve that the minimum transmittance in the wavelength range of 400 nm to 800 nm is 10% or more.

<Laminated Structure>

The optical member according to the form A comprises a laminated structure including two or more kinds of layers that are disposed on the substrate and have different materials.

(Material)

The layers constituting the laminated structure in the form A is preferably a layer including each of the two or more different kinds of materials.

The two or more different kinds of materials constituting the laminated structure in the form A may be two or more kinds of organic materials, may be two or more kinds of different inorganic materials, or may be a combination of one or more kinds of organic materials and one or more kinds of inorganic materials.

In view of the ease of film formation, the laminated structure in the embodiment A preferably includes two or more metal compounds selected from the group consisting of metal oxides, metal nitrides, metal oxynitrides, and metal sulfides.

It is preferable that the layers constituting the laminated structure in the form A are preferably two or more kinds of layers including the respective two or more kinds of metal compounds.

Examples of the specific aspects of the laminated structure in the form A include an aspect of including two or more kinds of layers (hereinafter, also referred to as a "metal oxide layer") including metal oxide, an aspect of including two or more kinds of layers (hereinafter, also referred to as a "metal nitride layer") including metal nitride, an aspect of including two or more kinds of layers (hereinafter, also referred to as a "metal oxynitride layer") including metal oxynitride, an aspect of including two or more kinds of layers (hereinafter, also referred to as a "metal sulfide layer") including metal sulfide, an aspect of including one or more kinds of metal oxide layers and one or more kinds of metal nitride layers, an aspect of including one or more kinds of metal oxide layers and one or more kinds of metal oxynitride layers, an aspect of including one or more kinds of metal oxide layer and one or more kinds of metal sulfide layers, an aspect of including one or more kinds of metal nitride layers and one or more kinds of metal oxynitride layers, an aspect of including one or more kinds of metal nitride layers and one or more kinds of metal sulfide layers, and an aspect of including one or more kinds of metal oxynitride layers and one or more kinds of metal sulfide layers.

A preferable aspect of the laminated structure in the form A is a structure in which the X layers (that is, the first layers) and the Y layers (that is, the second layers) are alternately disposed like the X layer/the Y layer/the X layer/the Y layer/the X layer, and the like, or a structure in which at least one kind of the other layers other than the X layer and the Y layer is inserted between any layers in the alternately disposed structure.

Examples of the structure in which at least one kind of the other layers is inserted between any layers include the structure of the X layer/the Y layer/a Z layer/the X layer/the Y layer/a W layer/the X layer, and the like. Here, the Z layer is a third layer, and the W layer is a fourth layer.

The metal element in the metal compound in the form A is preferably at least one kind (more preferably two or more kinds) of elements selected from the group consisting of Si, Al, Nb, Mg, Zr, Ge, and Zn.

The metal element in the metal compound preferably includes at least one kind (more preferably two or more kinds) selected from the group consisting of Si, Al, and Nb, more preferably includes at least one kind selected from the group consisting of Si and Al, and particularly preferably includes Si.

Examples of the metal oxide include $Al_2O_3$, $SiO_2$, $Nb_2O_5$, MgO, and $GeO_2$, ZnO, $ZrO_2$.

Examples of the metal nitride include AlN and SiN.

Examples of the metal oxynitride include AlON and SiON.

Examples of the metal sulfide include ZnS

In the form A, in view of further improving the minimum transmittance in the wavelength range of 400 nm to 800 nm, the two or more kinds of layers including different materials preferably includes two or more kinds of metal oxide layers and particularly preferably includes a combination of an $Al_2O_3$ layer and an $SiO_2$ layer.

(The Number of Layers)

The number of layers constituting the laminated structure in the form A is 10 or more as described above.

In view of reducing the thermal conductivity of the optical member, the number of layers constituting the laminated structure in the form A is preferably 20 or more, more preferably 50 or more, and even more preferably 100 or more.

The upper limit of the number of layers constituting the laminated structure in the form A is not particularly limited. In view of manufacturing suitability of the optical member, for example, the upper limit of the number of layers constituting the laminated structure is 10,000,000, preferably 3,000,000, and particularly preferably 1,000,000.

(Maximum Layer Thickness, Average Layer Thickness)

The maximum layer thickness of the layers constituting the laminated structure in the form A is 8 nm or less. Accordingly, as described above, the thermal conductivity of the optical member is reduced. Further, the interference of the light in a wavelength range of 400 nm to 800 nm is suppressed, and as a result, the reduction of the transmittance in this wavelength range is suppressed.

The maximum layer thickness of the layers constituting the laminated structure in the form A is preferably 5 nm or less, and more preferably 4 nm or less.

The lower limit of the maximum layer thickness in the layers constituting the laminated structure in the form A is not particularly limited. In view of the suitability of the layer formation (film formation), the lower limit of the maximum layer thickness of the layers constituting the laminated structure is preferably 1 nm and more preferably 2 nm.

The upper limit of the average layer thickness in the layers constituting the laminated structure in the form A is preferably 7 nm, more preferably 4 nm, and particularly preferably 3 nm.

The lower limit of the average layer thickness of the layers constituting the laminated structure in the form A is preferably 1 nm and more preferably 2 nm.

(CV Value)

In view of more reducing the thermal conductivity, with respect to the laminated structure in the form A, the CV value defined by the standard deviation of the layer thickness/the average layer thickness may be 0.05 or more.

In the present specification, the average layer thickness means an arithmetic average value of a population including the thicknesses of each of all the layers constituting the laminated structure.

In the present specification, the standard deviation of the layer thickness means the standard deviation of a population including the thickness of each of all the layers constituting the laminated structure.

The fact that the CV value of the laminated structure in the form A is 0.05 or more means, roughly speaking, that a certain degree of unevenness (specifically, unevenness between layers) is present in the layer thicknesses of the layers constituting the laminated structure.

In a case where the CV value of the laminated structure in the form A is 0.05 or more, the thermal conductivity is reduced more effectively. It is considered that the reason is that the phonon's Anderson localization occurs due to the presence of a certain degree of unevenness in the layer thicknesses of the layers constituting the laminated structure and the interference of phonons as described above, and accordingly, the average transmittance of the phonons decreases.

In view of more reducing the thermal conductivity, the CV value of the layer thickness in the layers constituting the laminated structure in the form A is more preferably 0.10 or more.

The upper limit of the CV values of the layer thicknesses of the layers constituting the laminated structure in the form A is not particularly limited, but for example, the upper limit is 0.60.

<Light Interference Layer A>

The optical member according to the form A preferably comprises at least one layer of the light interference layer (hereinafter, also referred to as a "light interference layer A") having the layer thickness greater than 8 nm. Accordingly, the optical function of the optical member can be further improved.

As described above, the layer thickness (8 nm or less even in the maximum layer thickness) of each layer constituting the laminated structure in the form A is extremely small in the wavelength of the visible light (400 to 800 nm), and thus with respect to the visible light, the laminated structure can be regarded as a single layer mixed material film having an average refractive index.

Therefore, seen from the laminated structure, the optical function of the optical member can be further improved by disposing the light interference layer A on the substrate side and/or on the opposite side to the substrate. For example, it is possible to cause the laminated structure to have an antireflection effect in a specific wavelength and to have a reflection increasing effect in a specific wavelength.

The layer thickness of the light interference layer A is not particularly limited, as long as the layer thickness is more than 8 nm, but the layer thickness is preferably 9 nm or more and more preferably 10 nm or more.

In view of the manufacturing suitability of the light interference layer, the upper limit of the layer thickness of the light interference layer A is preferably 1,000 nm, more preferably 200 nm, and particularly preferably 100 nm.

The material of the light interference layer A is preferably at least one metal compound selected from the group consisting of metal oxide, metal nitride, metal oxynitride, and metal fluoride.

The metal element in the metal compound as the material of the light interference layer A is preferably at least one element selected from the group consisting of Si, Al, Nb, Mg, Zr, La, Ti, Y, Ca, Ba, Li, and Na.

<Minimum Transmittance>

The minimum transmittance of the optical member according to the form A in a wavelength range of 400 nm to 800 nm is 10% or more.

In the present specification, the minimum transmittance in a wavelength range of 400 nm to 800 nm means a minimum value of the transmittance in a wavelength range of 400 nm to 800 nm.

The minimum transmittance in a wavelength range of 400 nm to 800 nm preferably 30% or more, more preferably 50% or more, and particularly preferably 80% or more.

The upper limit of the minimum transmittance in a wavelength range of 400 nm to 800 nm is not particularly limited, but in view of the manufacturing suitability of the optical member, the preferable upper limit is 99%.

<Maximum Reflectance>

In view of the antireflection function, the maximum reflectance of the optical member according to the form A in a wavelength range of 400 nm to 800 nm is preferably 10% or less, more preferably 6% or less, even more preferably 5% or less, and even more preferably 4% or less.

In the present specification, the maximum reflectance in a wavelength range of 400 nm to 800 nm means the maximum value of the reflectance in a wavelength range of 400 nm to 800 nm.

The maximum reflectance in a wavelength range of 400 nm to 800 nm may be 0% and may be more than 0%.

The reduction of the maximum reflectance in a wavelength range of 400 nm to 800 nm is more easily achieved, in a case where the optical member according to the form A comprises the light interference layer A.

The optical member according to the form A described above can be used as an antireflection film for various kinds of optical devices (for example, an optical sensor, an optical system of an image pick-up device, and a display device) or a film for decorating a heat insulation container.

Particularly, the optical member according to the form A described above is appropriately used as an antireflection film for an optical device used in a high temperature environment or a film for decorating a heat insulation container used in a high temperature environment.

[Form B]

The optical member according to the form B comprises a substrate, and a laminated structure including two or more kinds of layers having different materials which are disposed on the substrate, the number of layers constituting the laminated structure is 10 or more, the maximum layer thickness of the layers constituting the laminated structure is 8 nm or less, and the minimum transmittance in a wavelength range of 6 μm to 12 μm is 10% or more.

<Base Material>

Examples of the material of the substrate in the form B include metal and a metal compound.

The material of the substrate in the form B is preferably Si, Ge, ZnSe, ZnS, a mixture of TlBr and TlI, or a mixture of TlBr and TlCl. Accordingly, it is easy to achieve the minimum transmittance of 10% or more in a wavelength range of 6 μm to 12 μm.

<Laminated Structure>

The optical member according to the form B comprises a laminated structure including two or more kinds of layers having different materials which is disposed on a substrate.

A preferable aspect (preferable materials or the like) of the laminated structure in the form B is the same as the preferable aspect (preferable materials or the like) of the laminated structure in the form A.

In the form B, in view of improving the minimum transmittance in a wavelength range of 6 μm to 12 μm, two or more kinds of layers having different materials preferably include two or more kinds of metal nitride layers, and preferably include a combination of a SiN layer and an AlN layer.

(The Number of Layers)

A preferable range of the number of layers constituting the laminated structure in the form B is the same as the preferable range of the number of layers constituting the laminated structure in the form A.

(Maximum Layer Thickness and Average Layer Thickness)

In the form B, the maximum layer thickness of the layers constituting the laminated structure is 8 nm or less. Accordingly, as described above, the thermal conductivity of the optical member is reduced. The interference of the light (infrared light) in a wavelength range of 6 μm to 12 μm is suppressed, and as a result, the reduction of the minimum transmittance in this wavelength range is suppressed.

The maximum layer thickness of the layers constituting the laminated structure in the form B is preferably 5 nm or less and more preferably 4 nm or less.

The lower limit of the maximum layer thickness of the layers constituting the laminated structure in the form B is not particularly limited. In view of the suitability of the layer formation (film formation), the lower limit of the maximum layer thickness of the layers constituting the laminated structure is preferably 1 nm and more preferably 2 nm.

The upper limit of the average layer thickness of the layers constituting the laminated structure in the form B is preferably 7 nm, more preferably 4 nm, and particularly preferably 3 nm.

The lower limit of the average layer thickness of the layers constituting the laminated structure in the form B is preferably 1 nm and more preferably 2 nm.

(CV Value)

In view of further reducing the thermal conductivity, with respect to the laminated structure in the form B, the CV value defined by the standard deviation of the layer thickness/the average layer thickness may be 0.05 or more.

In the form B, in view of further reducing the thermal conductivity, the CV value of the layer thickness of the layers constituting the laminated structure is more preferably 0.10 or more.

The upper limit of the CV value of the layer thickness of the layers constituting the laminated structure in the form B is not particularly limited, and the upper limit is, for example, 0.60.

(Light Interference Layer B)

The optical member according to the form B preferably comprises at least one layer of light interference layers (hereinafter, also referred to as a "light interference layer B") having a layer thickness greater than 8 nm. Accordingly, the optical function of the optical member can be further improved.

As described above, the layer thickness (10 nm or less even in the maximum layer thickness) of each layer constituting the laminated structure in the form B is extremely small in a wavelength range of 6 μm to 12 μm, and thus with respect to the infrared rays in the wavelength range, the laminated structure can be regarded as a single layer mixed material film having an average refractive index.

Therefore, seen from the laminated structure, the optical function of the optical member can be further improved by disposing the light interference layer B on the substrate side and/or on the opposite side to the substrate. For example, it is possible to cause the laminated structure to have an antireflection effect in a specific wavelength and have a reflection increasing effect in a specific wavelength.

The layer thickness of the light interference layer B is not particularly limited, as long as the layer thickness is more than 8 nm, but the layer thickness is preferably more than 100 nm and more preferably more than 120 nm.

In view of the manufacturing suitability of the light interference layer, the upper limit of the layer thickness in the light interference layer B is preferably 100 μm.

The material of the light interference layer B is preferably at least one metal compound selected from the group consisting of metal oxide, metal nitride, metal oxynitride, and metal fluoride, Si (single substance), or Ge (single substance).

The metal element in the metal compound as the material of the light interference layer B is preferably at least one element selected from the group consisting of Si, Al, Nb, Mg, Zr, La, Ti, Y, Ca, Ba, Li, and Na.

Minimum Transmittance)

With respect to the optical member according to the form B, the minimum transmittance in a wavelength range of 6 µm to 12 µm is 10% or more.

In the present specification, the minimum transmittance in a wavelength range of 6 µm to 12 µm means the minimum value of the transmittance in a wavelength range of 6 µm to 12 µm.

The minimum transmittance in a wavelength range of 6 µm to 12 µm is preferably 30% or more and more preferably 50% or more.

The upper limit of the minimum transmittance in a wavelength range of 6 µm to 12 µm is not particularly limited, but in view of the manufacturing suitability of the optical member, the preferable upper limit is 99%, more preferable upper limit is 90%, and the even more preferable upper limit is 80%.

<Maximum Reflectance>

In view of the antireflection function, with respect to the optical member according to the form B, the maximum reflectance in a wavelength range of 6 µm to 12 µm is preferably 40% or less, more preferably 30% or less, and even more preferably 20% or less.

In the present specification, the maximum reflectance in a wavelength range of 6 µm to 12 µm means the maximum value of the reflectance in a wavelength range of 6 µm to 12 µm.

The maximum reflectance in a wavelength range of 6 µm to 12 µm may be 0% and may be more than 0%.

The reduction of the maximum reflectance in a wavelength range of 6 µm to 12 µm can be more easily achieved in a case where the optical member according to the form B comprises the light interference layer B.

The optical member according to the form B described above can be used, for example, as a window member for an infrared heater, a window member for a radiation cooling device, or a surface member of a solar heat collecting device.

EXAMPLES

Hereinafter, examples of the present disclosure are provided, but the present disclosure is not limited to the following examples.

Example 1 (Example of Form A)

<Manufacturing of Optical Member (Without Light Interference Layer)>

On a soda glass substrate as the substrate, by the vapor deposition with an electron cyclotron sputtering device, each 50 layers of $Al_2O_3$ layers as the first layers (layers X) and $SiO_2$ layers as the second layers (layers Y) were alternately (that is, in a disposition of the substrate/the layer X/the layer Y/the layer X/the layer Y, and the like. The same is applied below.) were formed, so as to form a laminated structure having 100 layers.

At this point, all of the film formation times of the 50 layers of $Al_2O_3$ layers were set to be the same, and all of the film formation times of the 50 layers of $SiO_2$ layers were set to be the same, such that each layer thickness of all of the 100 layers was 3.0 nm.

As described above, an optical member of Example 1 (an example of the form A) was obtained.

<Layer Thickness Measurement>

A cross section of the laminated structure in the optical member was formed by focused ion beam (FIB) processing, and a scanning transmission electron microscope (STEM) image of the obtained cross section at a magnification of 160,000 times was obtained. As STEM, Titan 80-300 manufactured by FEI Company was used.

Based on the obtained STEM image, each layer thickness of the 100 layers was measured.

The average layer thickness and the maximum layer thickness were respectively determined by using each layer thickness of the obtained 100 layers as a population.

Results thereof are as presented in Table 4.

<Evaluation of Thermal Conductivity>

In order to obtain a thermoreflectance signal of the laminated structure of the optical member of Example 1, a 20 nm Al thin film was formed on the surface of the uppermost layer of the laminated structure by a radio frequency (RF) sputtering method. After the formation of the Al thin film, a thermoreflectance signal of the laminated structure of the optical member of Example 1 was acquired by a surface heating/surface detection type thermoreflectance method by using laser light with a period of 80 MHz.

In the same manner, the thermoreflectance signal of the film ($SiO_2$ single layer, layer thickness: 300 nm) of Comparative Example 1 described below was acquired.

The acquired thermoreflectance signals of Example 1 and Comparative Example 1 each were reproduced by heat conduction simulation according to a finite element method, so as to derive respective thermoreflectance signals. Here, the heat conduction simulation was performed for 2,000 ps to simulate the time from the start of heating at a period of 80 MHz to the steady state.

In the derived thermoreflectance signal, the thermal conductivity of the laminated structure of Example 1 was calculated based on the value 200 ps before the last heating pulse. The calculation condition of the thermal conductivity was a condition in which the thermal conductivity of the film of Comparative Example 1 and 1.38 W/(m·K) of the literature value of the thermal conductivity of $SiO_2$ coincide with each other.

The thermal conductivity (the calculation result by simulation) of the laminated structure of the optical member of Example 1 is presented in Table 4 as a relative value in a case where the thermal conductivity of the film ($SiO_2$ single layer, layer thickness: 300 nm) of Comparative Example 1 was set as 100.

<Spectral Characteristics (Transmittance and Reflectance)>

Spectral characteristics (reflection spectrum and transmission spectrum) of the optical member of Example 1 in a wavelength range of 400 nm to 800 nm was measured by using a spectrophotometer U-4000 manufactured by Hitachi, Ltd.

Figure 2:
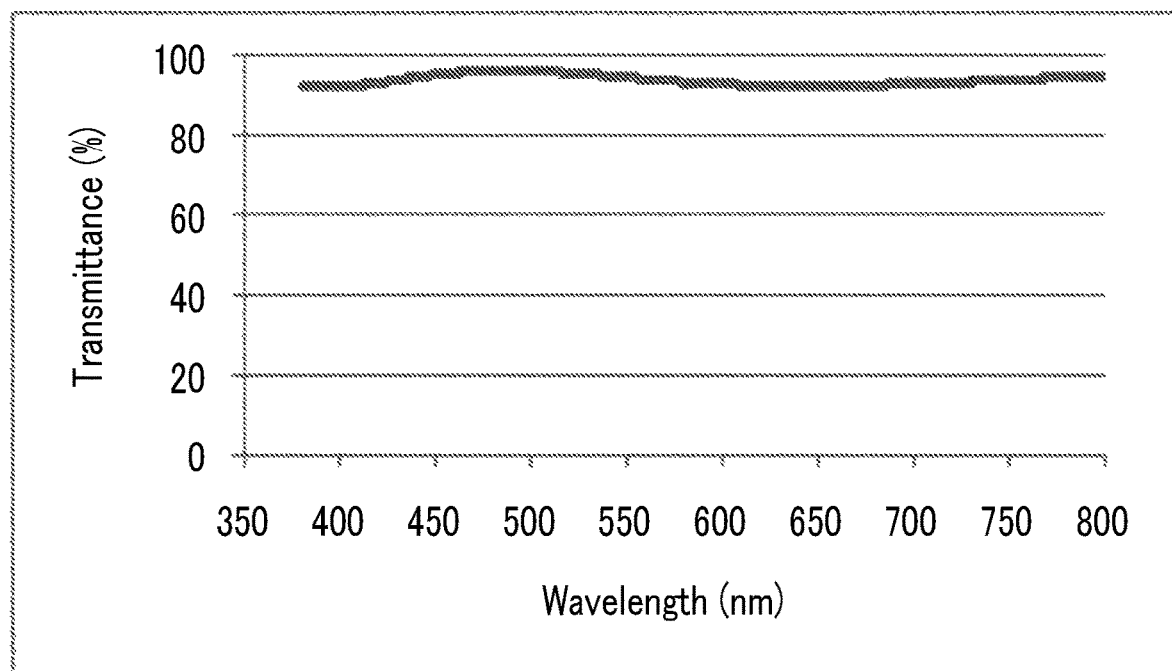
FIG. 2 is a transmission spectrum of the optical member of Example 1 in a wavelength range of 400 nm to 800 nm.

FIG. 1 is a reflection spectrum of optical member of Example 1 in a wavelength range of 400 nm to 800 nm, and FIG. 2 is a transmission spectrum of the optical member of Example 1 in a wavelength range of 400 nm to 800 nm.

The minimum transmittance and the maximum reflectance in a wavelength range of 400 nm to 800 nm are presented in Table 4.

Example 2 (Example of Form A)

<Forming of Optical Member (with Light Interference Layer)>

Light interference layers 1 to 9 of the materials presented in Table 1 were formed on a soda glass substrate as the substrate in this order by using a radio frequency (RF) sputtering method. Subsequently, the laminated structure (100 layers) formed in Example 1 was formed on the light interference layer 9. The light interference layers 10 and 11 presented in Table 1 were formed on the formed laminated structure in this order.

As above, an optical member of Example 2 (example of form A) Example 2 (example of form A) having the layer configuration presented in Table 1 was obtained.

The refractive index presented in Table 1 is a refractive index (the same is applied to Tables 2 and 3 described below) in a measurement wavelength of 540 nm which is measured by using a spectroscopic ellipsometer MASS manufactured by Five Lab Co., Ltd.

The thickness presented in Table 1 is a value measured by the same method as in the layer thickness measurement in Example 1 (here, the measurement magnification was appropriately selected according to the thickness of the object to be measured) (The same is applied to Tables 2 and 3 described below).

TABLE 1

Layer configuration of optical member of Example 2

| | Material | Refractive index | Thickness (nm) |
|---|---|---|---|
| Light interference layer 11 | SiO$_2$ | 1.47 | 109.04 |
| Light interference layer 10 | TiO$_2$ | 2.35 | 10.22 |
| Laminated structure | Laminated structure of Example 1 (100 layers in total) | 1.65 | 300 |
| Light interference layer 9 | SiO$_2$ | 1.47 | 47.36 |
| Light interference layer 8 | TiO$_2$ | 2.35 | 17.92 |
| Light interference layer 7 | SiO$_2$ | 1.47 | 38.87 |
| Light interference layer 6 | TiO$_2$ | 2.35 | 51.45 |
| Light interference layer 5 | SiO$_2$ | 1.47 | 17.19 |
| Light interference layer 4 | TiO$_2$ | 2.35 | 39.46 |
| Light interference layer 3 | SiO$_2$ | 1.47 | 47.62 |
| Light interference layer 2 | TiO$_2$ | 2.35 | 10.79 |
| Light interference layer 1 | SiO$_2$ | 1.47 | 84.73 |
| Substrate | Soda glass | 1.52 | — |

The measurement and the evaluation of the obtained optical member (with a light interference layer) were performed in the same manner as in Example 1.

Results thereof are as presented in Table 4.

Figure 3:
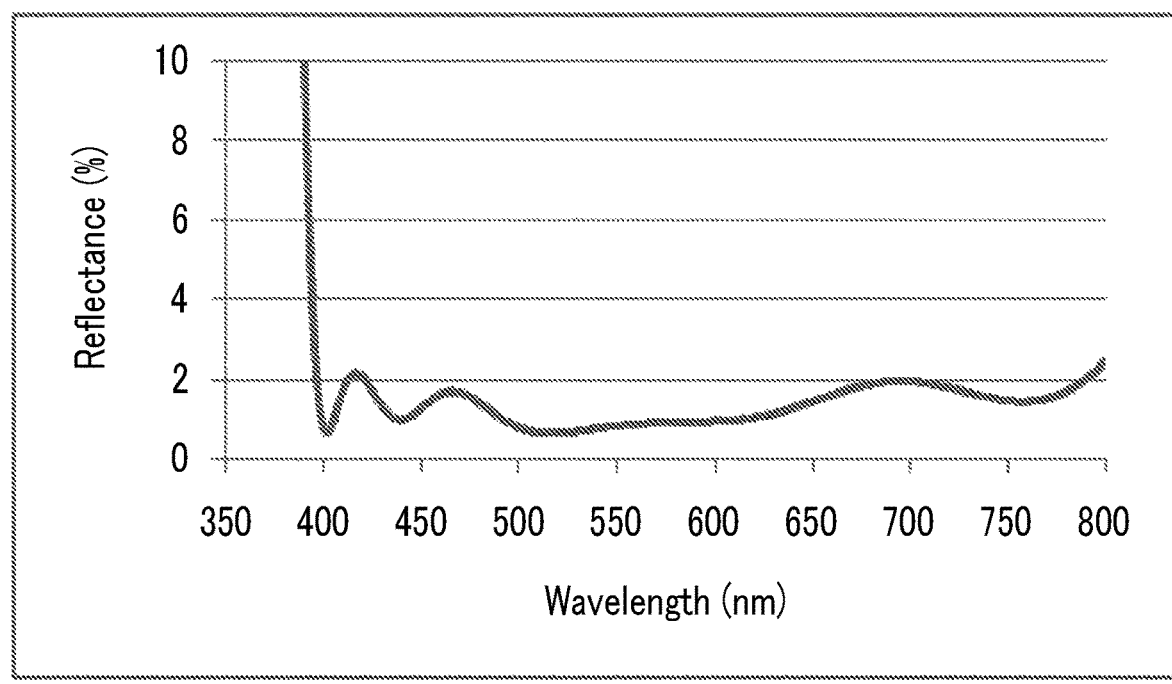
FIG. 3 is a reflection spectrum of an optical member of Example 2 in a wavelength range of 400 nm to 800 nm.
Figure 4:
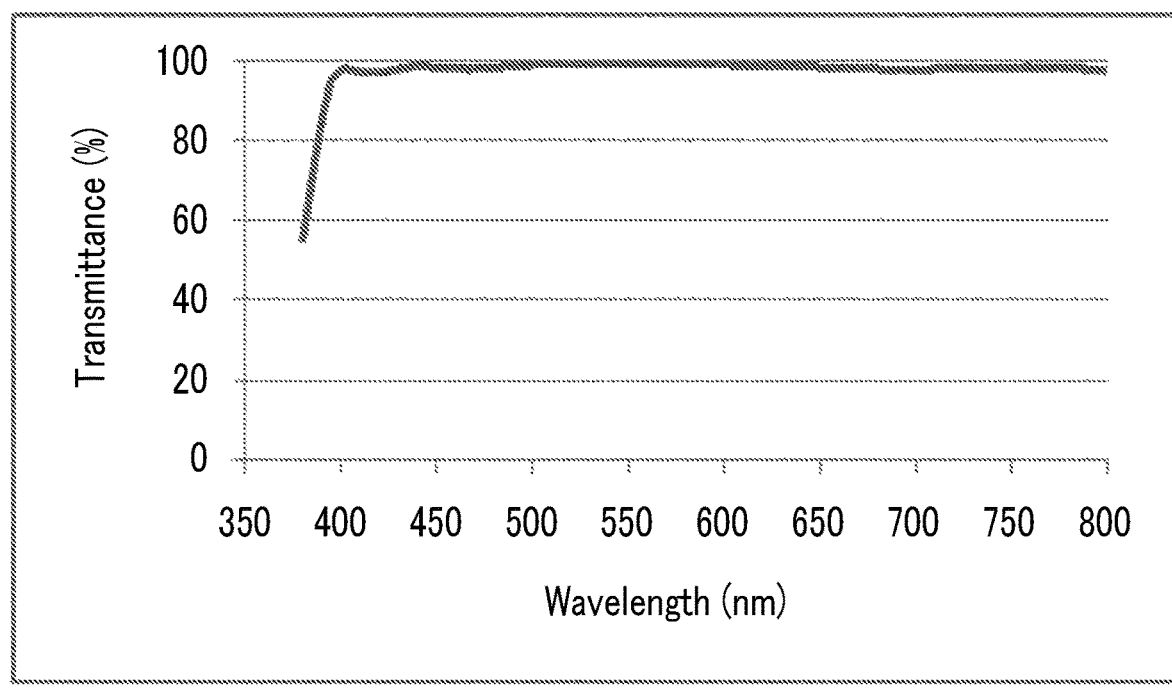
FIG. 4 is a transmission spectrum of the optical member of Example 2 in a wavelength range of 400 nm to 800 nm.

FIG. 3 is a reflection spectrum of the optical member of Example 2 in a wavelength range of 400 nm to 800 nm, and FIG. 4 is a transmission spectrum of Example 2 in a wavelength range of 400 nm to 800 nm.

Example 3 (Example of Form A)

<Forming of Optical Member (with Light Interference Layer)>

Light interference layers 1 to 6 of the materials presented in Table 2 were formed on a synthetic quartz substrate as the substrate in this order by using a radio frequency (RF) sputtering method. On the light interference layer 6, by the vapor deposition with an electron cyclotron sputtering device, each 50 layers of Al$_2$O$_3$ layers as the first layers (layers X) and SiO$_2$ layers as the second layers (layers Y) were alternately formed, so as to form a laminated structure having 100 layers. At this point, the layer thickness for each layer is caused to be uneven by changing the film formation time for each layer. The light interference layers 7 and 8 presented in Table 2 were formed on the formed laminated structure in this order.

As described above, the optical member of Example 3 (Example of the form A) having the layer configuration presented in Table 2 was obtained.

With respect to the laminated structure of the optical member of Example 3, the CV value defined by the standard deviation of the layer thickness/the average layer thickness was 0.13.

TABLE 2

Layer configuration of optical member of Example 3

| | Material | Refractive index | Thickness (nm) |
|---|---|---|---|
| Light interference layer 8 | SiO$_2$ | 1.47 | 111.28 |
| Light interference layer 7 | TiO$_2$ | 2.35 | 8.5 |
| Laminated structure | Laminated structure of Al$_2$O$_3$ layers/SiO$_2$ layers (100 layers in total) | 1.65 | 290 |
| Light interference layer 6 | SiO$_2$ | 1.47 | 201.78 |
| Light interference layer 5 | TiO$_2$ | 2.35 | 15.2 |
| Light interference layer 4 | SiO$_2$ | 1.47 | 52.12 |
| Light interference layer 3 | TiO$_2$ | 2.35 | 24.93 |
| Light interference layer 2 | SiO$_2$ | 1.47 | 54.34 |
| Light interference layer 1 | TiO$_2$ | 2.35 | 12.44 |
| Substrate | Quartz glass | 1.46 | — |

The measurement and the evaluation of the obtained optical member (with a light interference layer) were performed in the same manner as in Example 1.

Results thereof are as presented in Table 4.

Figure 5:
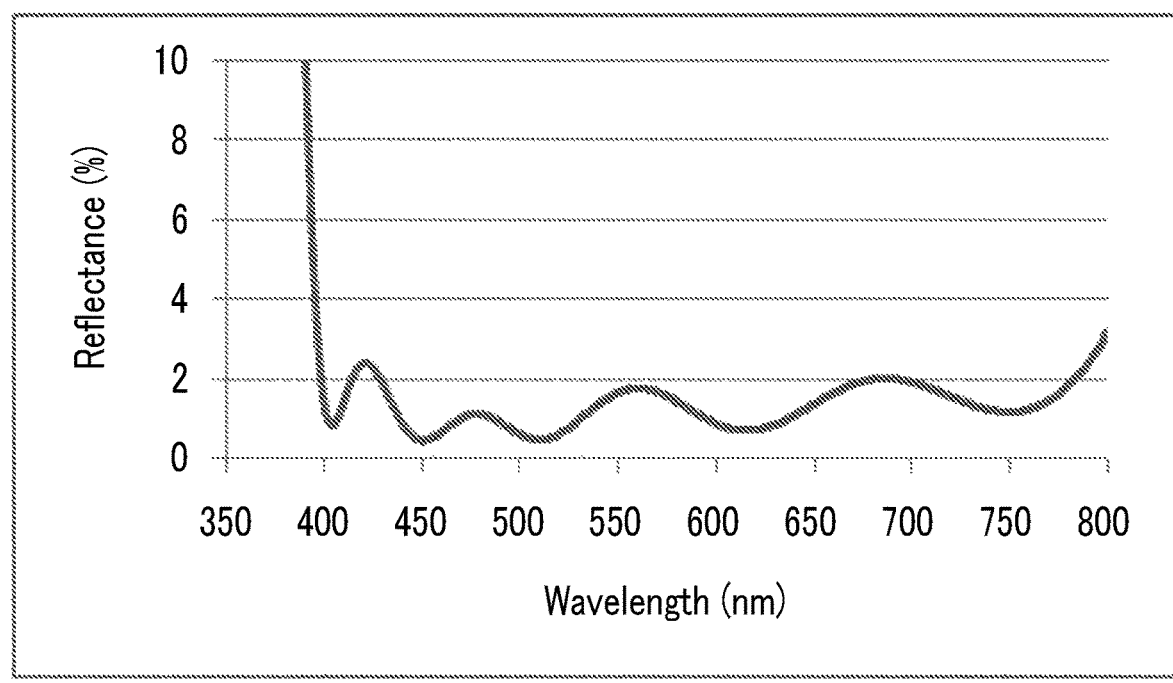
FIG. 5 is a reflection spectrum of an optical member of Example 3 in a wavelength range of 400 nm to 800 nm.
Figure 6:
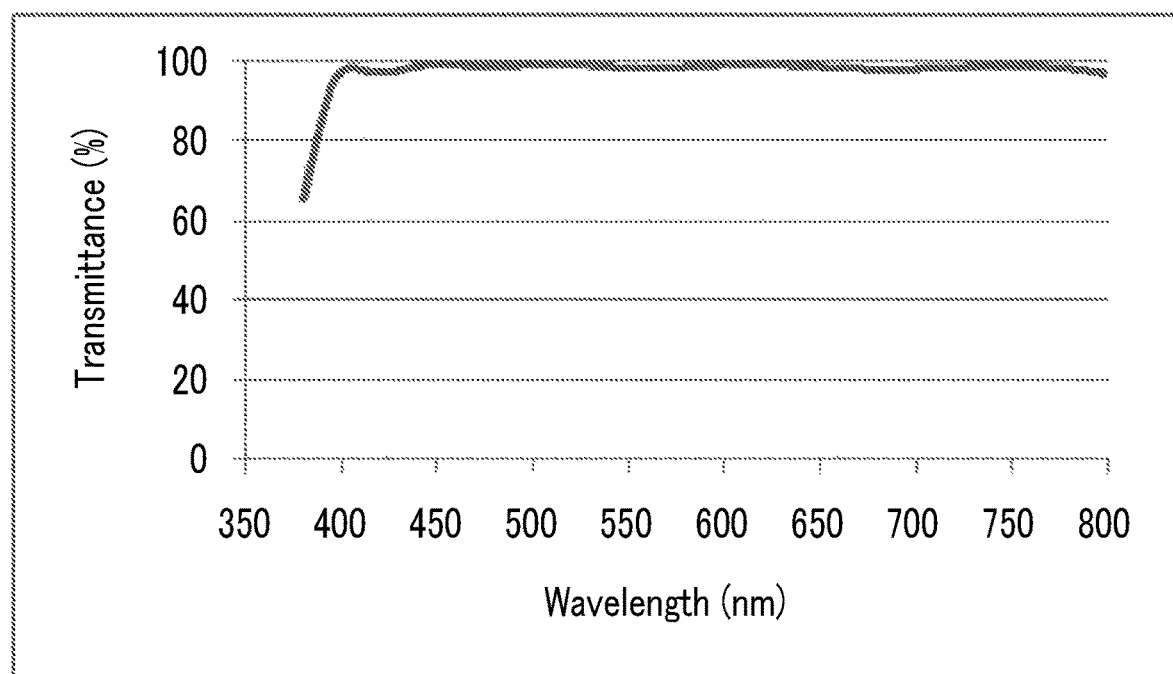
FIG. 6 is a transmission spectrum of the optical member of Example 3 in a wavelength range of 400 nm to 800 nm.

FIG. 5 is a reflection spectrum of the optical member of Example 3 in a wavelength range of 400 nm to 800 nm, and FIG. 6 is a transmission spectrum of the optical member of Example 3 in a wavelength range of 400 nm to 800 nm.

Example 4 (Example of Form B)

<Forming of Optical Member (with Light Interference Layer)>

A ZnS layer as the light interference layer was formed on a germanium (Ge) substrate as the substrate by electron beam evaporation. On the light interference layer, each 50 layers of SiN layers and AlN layers were alternately formed by vapor deposition using an electron cyclotron sputtering device, so as to form a laminated structure (the number of layers was 100).

At this point, all of the film formation times of the 50 layers of SiN layers were set to be the same, and all of the film formation times of the 50 layers of AlN layers were set to be the same, such that each layer thickness of all of the 100 layers was 3 nm.

As above, an optical member (with a light interference layer) of Example 4 (an example of the form B) having a layer configuration presented in Table 3 was obtained.

TABLE 3

Layer configuration of optical member of Example 4

|  | Material | Refractive index | Thickness (nm) |
|---|---|---|---|
| Laminated structure | Laminated structure of $Al_2O_3$ layers/$SiO_2$ layers (100 layers in total) | 1.86 | 300 |
| Light interference layer | ZnS | 2.22 | 713.98 |
| Substrate | Ge | 4.00 | — |

With respect to the obtained optical member (with a light interference layer), the measurements and evaluations were performed in the same manner as in Example 1, except that the measurement range of the spectral characteristics was changed to the wavelength range of 4 μm to 15 μm, and the minimum transmittance and the maximum reflectance in the wavelength range of 6 μm to 12 μm were obtained.

Results thereof are as presented in Table 4.

Figure 7:
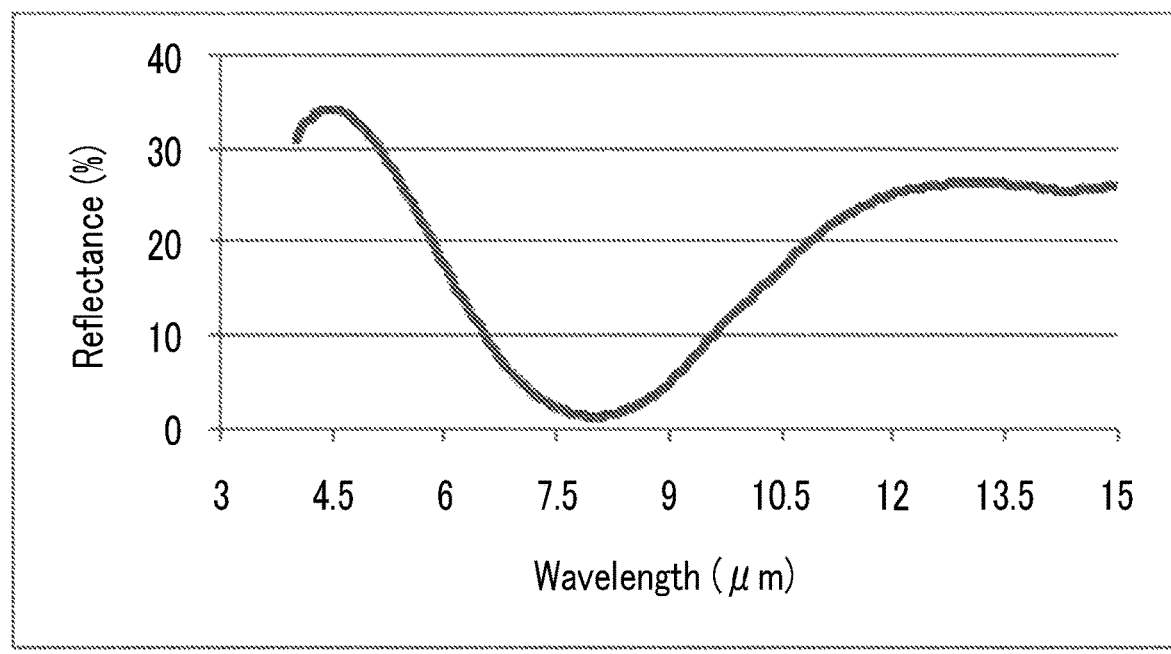
FIG. 7 is a reflection spectrum of an optical member of Example 4 in a wavelength range of 4 µm to 15 µm.
Figure 8:
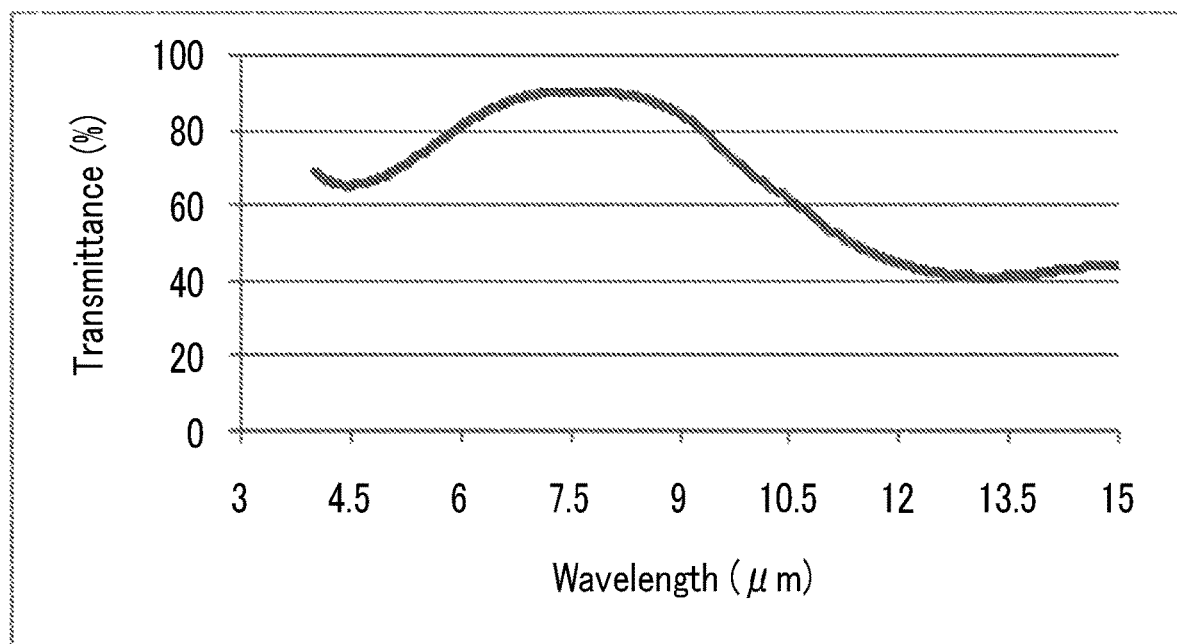
FIG. 8 is a transmission spectrum of the optical member of Example 4 in a wavelength range of 4 µm to 15 µm.

FIG. 7 is a reflection spectrum of the optical member of Example 4 in a wavelength range of 4 μm to 15 μm, and FIG. 8 is a transmission spectrum of the optical member of Example 4 in a wavelength range of 4 μm to 15 μm.

Comparative Example 1

One $SiO_2$ layer was formed on the soda glass substrate as the substrate by the vapor deposition with an electron cyclotron sputtering device.

With respect to the obtained $SiO_2$ layer, the measurement and the evaluation were performed in the same manner as in Example 1.

Results thereof are as presented in Table 4.

Figure 9:
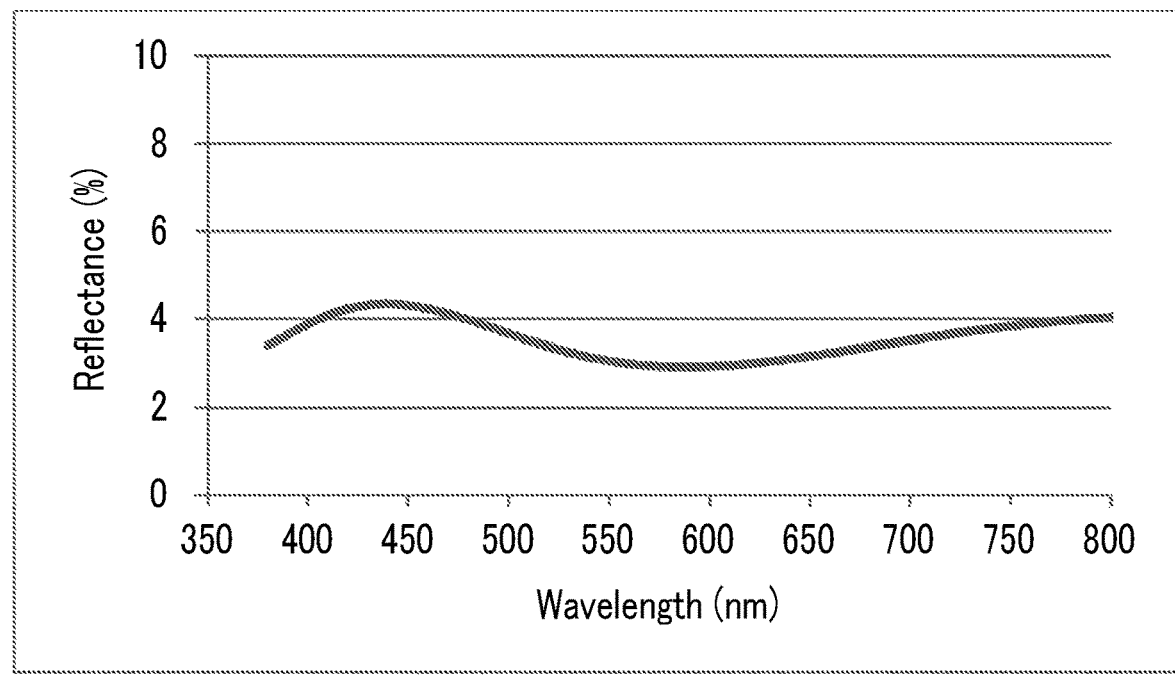
FIG. 9 is a reflection spectrum of an optical member of Comparative Example 1 in a wavelength range of 400 nm to 800 nm.
Figure 10:
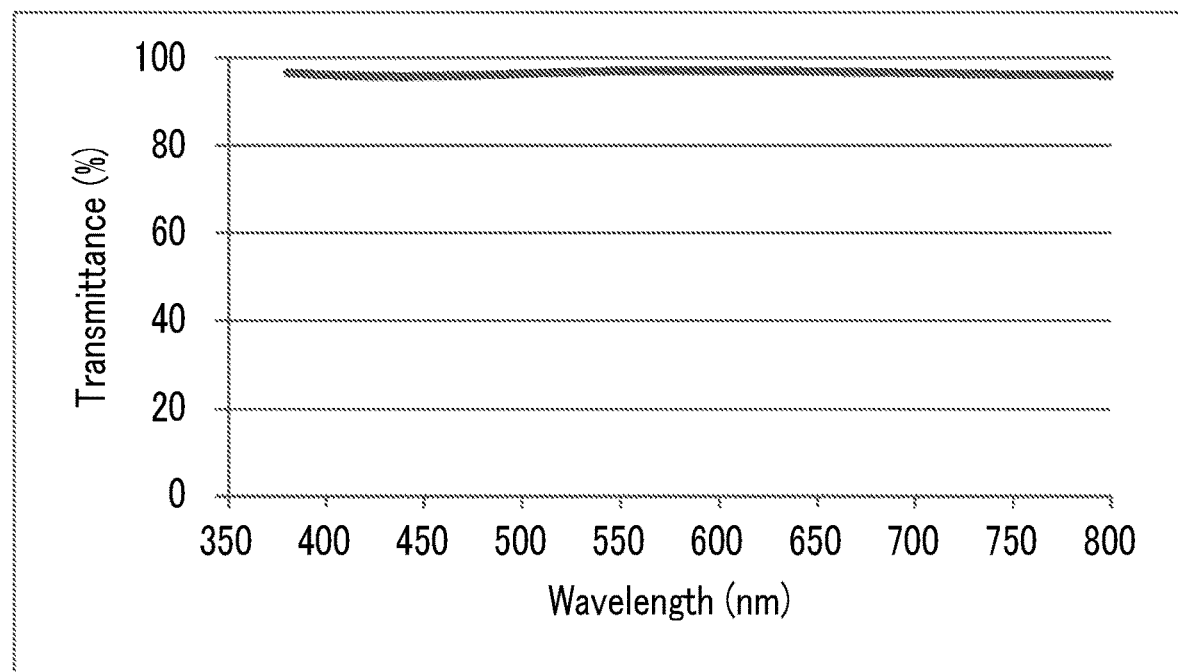
FIG. 10 is a transmission spectrum of the optical member of Comparative Example 1 in a wavelength range of 400 nm to 800 nm.

FIG. 9 is a reflection spectrum of the optical member of Comparative Example 1 in a wavelength range of 400 nm to 800 nm, and FIG. 10 is a transmission spectrum of the optical member of Comparative Example 1 in a wavelength range of 400 nm to 800 nm.

Comparative Example 2

On a soda glass substrate as the substrate, $Al_2O_3$ layers (layers X) and $SiO_2$ layers (layers Y) were alternately formed by vapor deposition using an electron cyclotron sputtering device, so as to form a laminated structure having seven layers (specifically, four $Al_2O_3$ layers and three $SiO_2$ layers). At this point, the layer thickness for each layer is caused to be uneven by changing the film formation time for each layer.

With respect to the obtained laminated structure, the measurement and the evaluation were performed in the same manner as in Example 1.

Results thereof are as presented in Table 4.

Figure 11:
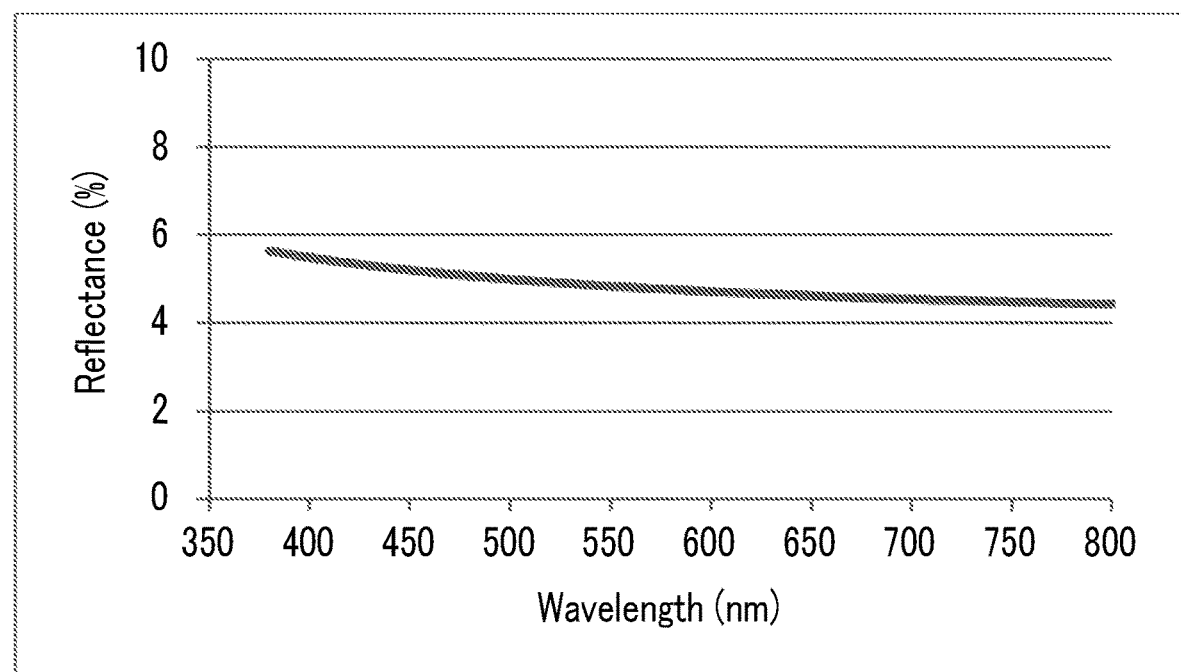
FIG. 11 is a reflection spectrum of an optical member of Comparative Example 2 in a wavelength range of 400 nm to 800 nm.
Figure 12:
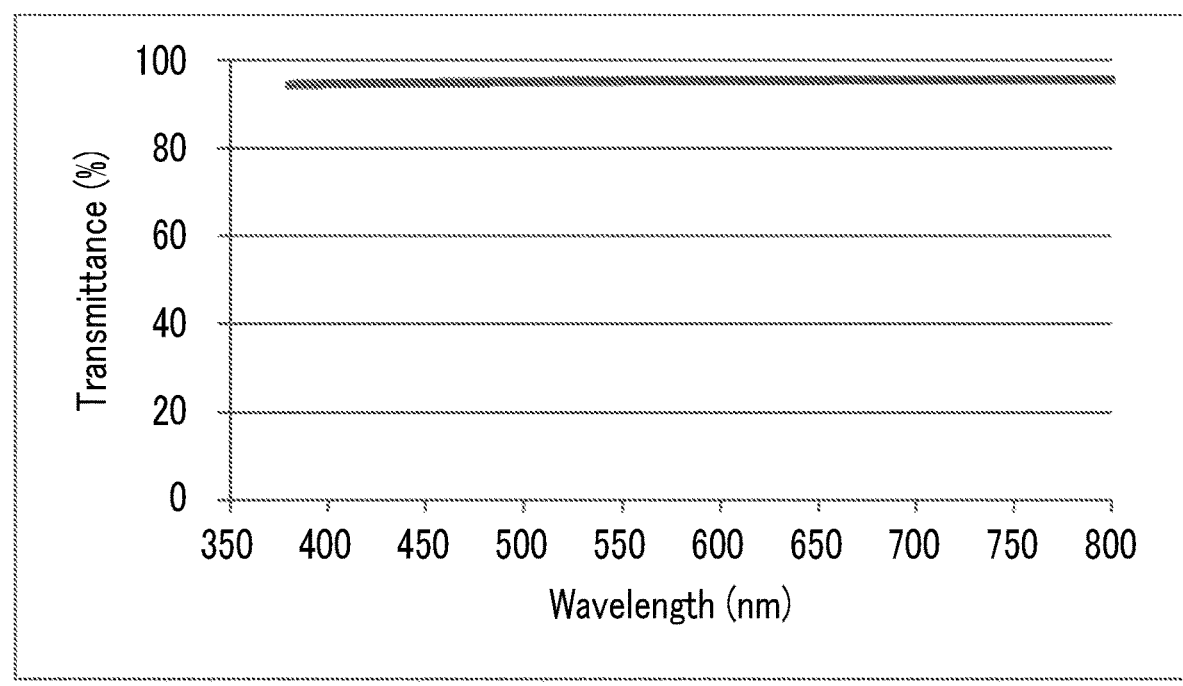
FIG. 12 is a transmission spectrum of the optical member of Comparative Example 2 in a wavelength range of 400 nm to 800 nm.

FIG. 11 is a reflection spectrum of the optical member of Comparative Example 2 in a wavelength range of 400 nm to 800 nm, and FIG. 12 is a transmission spectrum of the optical member of Comparative Example 2 in a wavelength range of 400 nm to 800 nm.

Comparative Example 3

On a soda glass substrate as the substrate, $Al_2O_3$ layers (layers X) and $SiO_2$ layers (layers Y) were alternately formed by vapor deposition using an electron cyclotron sputtering device, so as to form a laminated structure having 25 layers (specifically, 13 $Al_2O_3$ layers and 12 $SiO_2$ layers). At this point, the layer thickness for each layer is caused to be uneven by changing the film formation time for each layer.

With respect to the obtained laminated structure, the measurement and the evaluation were performed in the same manner as in Example 1.

Figure 13:
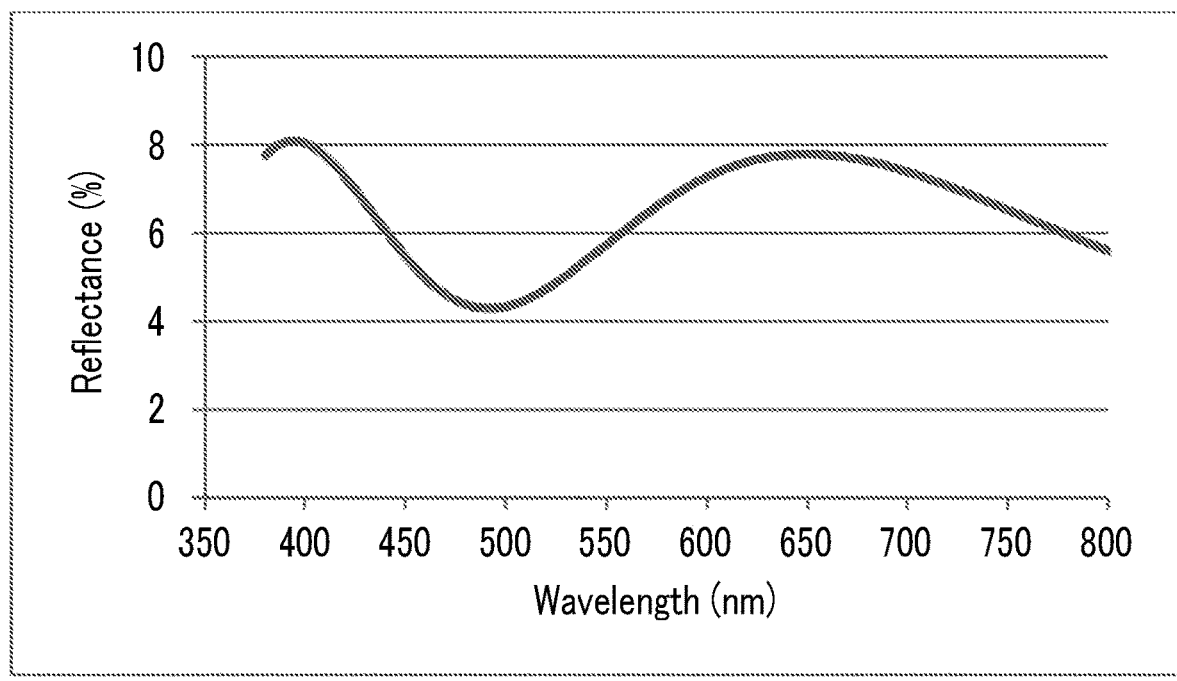
FIG. 13 is a reflection spectrum of an optical member of Comparative Example 3 in a wavelength range of 400 nm to 800 nm.
Figure 14:
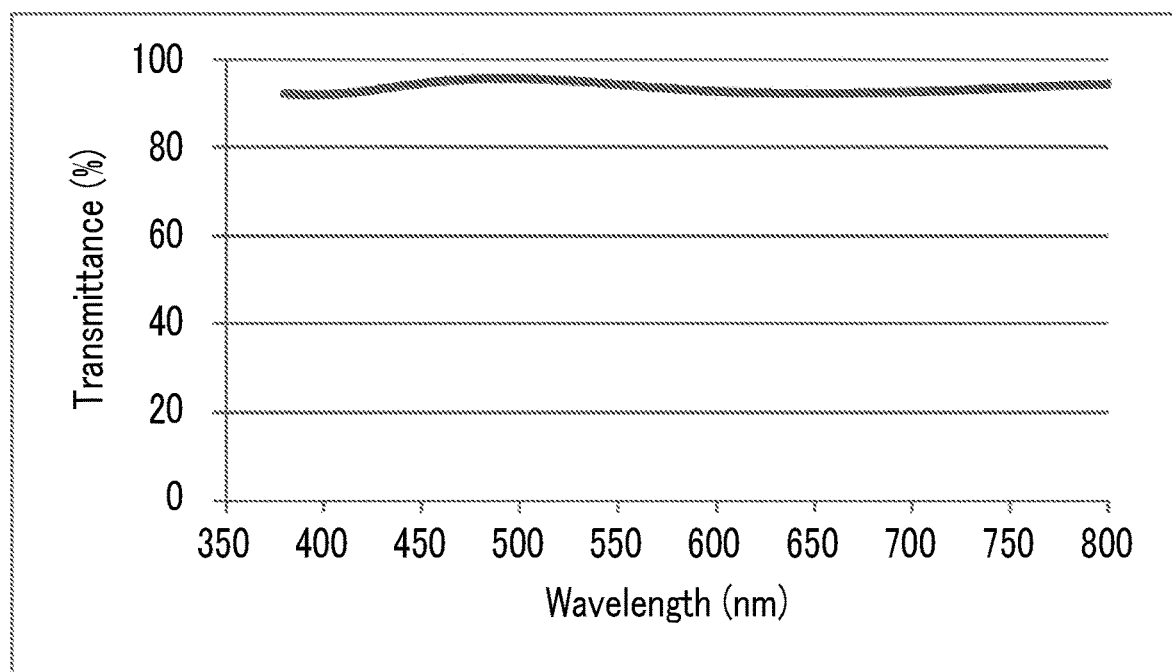
FIG. 14 is a transmission spectrum of the optical member of Comparative Example 3 in a wavelength range of 400 nm to 800 nm.

FIG. 13 is a reflection spectrum of the optical member of Comparative Example 3 in a wavelength range of 400 nm to 800 nm, and FIG. 14 is a transmission spectrum of the optical member of Comparative Example 3 in a wavelength range of 400 nm to 800 nm.

Results of the examples and the comparative Examples are presented in Table 4.

TABLE 4

| | Optical member | | | | | | | | Wavelength range of 400 nm to 800 nm | | Wavelength range of 6 μm to 12 μm | | Thermal conductivity |
|---|---|---|---|---|---|---|---|---|---|---|---|---|---|
| | | Laminated structure | | | | | | | | | | | |
| | | Layer X | | Layer Y | | | Average layer thickness (nm) | Maximum layer thickness (nm) | Light interference layer | Minimum transmittance (%) | Maximum reflectance (%) | Minimum transmittance (%) | Maximum reflectance (%) | |
| | Material of substrate | Material | Number of layers | Material | Number of layers | Number of layers | | | | | | | | laminated structure (relative value) |
| Example 1 | Soda glass | $Al_2O_3$ | 50 | $SiO_2$ | 50 | 100 | 3.0 | 3.0 | None | 92 | 7.8 | — | — | 83 |
| Example 2 | Soda glass | $Al_2O_3$ | 50 | $SiO_2$ | 50 | 100 | 3.0 | 3.0 | Presence | 97 | 2.5 | — | — | 83 |
| Example 3 | Synthetic quartz glass | $Al_2O_3$ | 50 | $SiO_2$ | 50 | 100 | 2.9 | 3.5 | Presence | 97 | 3.2 | — | — | 54 |
| Example 4 | Ge | SiN | 50 | AlN | 50 | 100 | 3.0 | 3.0 | Presence | — | — | 45 | 26 | 70 |
| Comparative Example 1 | Soda glass | $SiO_2$ | 1 | None | | 1 | 300 | 300 | None | 96 | 4.3 | — | — | 100 |
| Comparative Example 2 | Soda glass | $Al_2O_3$ | 4 | $SiO_2$ | 3 | 7 | 3.1 | 3.5 | None | 95 | 5.5 | — | — | 90 |
| Comparative Example 3 | Soda glass | $Al_2O_3$ | 13 | $SiO_2$ | 12 | 25 | 11.9 | 14.3 | None | 92 | 8.0 | — | — | 91 |

As presented in Table 4, with respect to the optical members (specific examples of the form A) of Examples 1 to 3 in which the number of layers constituting the laminated structure was 10 or more, the maximum layer thickness of the layers constituting the laminated structure was 8 nm or less, and the minimum transmittance in a wavelength range of 400 nm to 800 nm was 10% or more, the thermal conductivity was reduced compared with the optical members of Comparative Examples 1 to 3. The optical members of Example 1 to 3 had the maximum reflectance of 10% or less in a wavelength range of 400 nm to 800 nm and comprised the antireflection function in the wavelength range.

Also in Examples 1 to 3, it is confirmed that the optical members of Examples 2 and 3 comprising the light interference layers had more excellent optical functions (specifically, the minimum transmittance in the wavelength range was high, and the maximum reflectance in the wavelength range was low).

In the optical member (specific example of the form B) of Example 4 in which the number of layers constituting the laminated structure was 10 or more, the maximum layer thickness of the layers constituting the laminated structure was 10 nm or less, and the minimum transmittance in a wavelength range of 6 μm to 12 μm was 10% or more, the low thermal conductivity was exhibited. The optical member of Example 4 had the maximum reflectance of 40% or less in a wavelength range of 6 μm to 12 μm, and comprised an excellent antireflection function in the wavelength range.

The disclosure of JP2017-069168 filed on Mar. 30, 2017 is incorporated herein by reference in its entirety.

All documents, patent applications, and technical standards described in the present specification are incorporated into the present specification to the same extent in a case where each individual document, patent application, and technical standard was specifically and individually indicated to be incorporated by reference.

What is claimed is:

1. An optical member comprising:
    a substrate; and
    a laminated structure including two or more kinds of layers having different materials which are disposed on the substrate,
    a number of layers constituting the laminated structure being 10 or more,
    a maximum layer thickness of the layers constituting the laminated structure being 8 nm or less, and
    a minimum transmittance in a wavelength range of 400 nm to 800 nm or in a wavelength range of 6 μm to 12 μm being 10% or more.

2. The optical member according to claim 1, wherein the number of layers constituting the laminated structure is 100 or more.

3. The optical member according to claim 1, wherein the laminated structure includes two or more kinds of metal compounds selected from the group consisting of a metal oxide, a metal nitride, a metal oxynitride, and a metal sulfide.

4. The optical member according to claim 3, wherein a metal element in the two or more kinds of metal compounds is at least one kind of element selected from the group consisting of Si, Al, Nb, Mg, Zr, Ge, and Zn.

5. The optical member according to claim 1, further comprising a light interference layer having a layer thickness greater than 8 nm.

6. The optical member according to claim 1, wherein the minimum transmittance in a wavelength range of 400 nm to 800 nm is 10% or more, and the maximum reflectance in a wavelength range of 400 nm to 800 nm is 10% or less.

7. The optical member according to claim 1, wherein the minimum transmittance in a wavelength range of 400 nm to 800 nm is 10% or more, and two or more kinds of layers having different materials include a combination of $Al_2O_3$ layers and $SiO_2$ layers.

8. The optical member according to claim 1, wherein the minimum transmittance in a wavelength range of 6 μm to 12 μm is 10% or more, and the maximum reflectance in a wavelength range of 6 μm to 12 μm is 40% or less.

9. The optical member according to claim 1, wherein the minimum transmittance in a wavelength range of 6 μm to 12 μm is 10% or more, and the two or more kinds of layers having different materials include a combination of a SiN layer and an AlN layer.

* * * * *